United States Patent [19]
Marceau

[11] 3,710,882
[45] Jan. 16, 1973

[54] FRONT WHEEL STEERING ASSEMBLY

[76] Inventor: Rene Marceau, Honfleur, Bellechasse, Quebec, Canada

[22] Filed: Nov. 23, 1970

[21] Appl. No.: 92,051

[52] U.S. Cl..................180/9.38, 180/5 R, 280/96.2
[51] Int. Cl. ............................................B62d 55/02
[58] Field of Search ..280/96.2, 103, 95; 180/5, 9.38, 180/9.34

[56] References Cited

UNITED STATES PATENTS

| | | | |
|---|---|---|---|
| 2,733,932 | 2/1956 | Stidham | 280/103 |
| 2,312,071 | 2/1943 | Broadwater | 180/5 R |
| 3,578,095 | 5/1971 | Hauser | 180/5 R |
| 3,570,617 | 3/1971 | O'Day | 180/5 R |
| 2,043,228 | 6/1936 | Best | 280/96.2 R |

Primary Examiner—Richard J. Johnson
Attorney—Pierre Lesperance

[57] ABSTRACT

A front wheel steering assembly particularly constructed and arranged to replace the front skis of snowmobiles to adapt the latter for use on other surfaces than ice and snow, but also applicable to other vehicles such as farm tractors. A front wheel steering assembly including a pair of parallel resilient blades having their adjacent outer ends pivotally interconnected by a pair of wheel supporting members to form with the latter an articulated parallelogram frame, and at least one connecting element pivoted at one point of each of the resilient blades and arranged to be fixed to a steering axle for rotation therewith to cause reciprocating movement of the resilient blades in opposite parallel directions lengthwise of each other and a resultant steering, in the same angular direction, of the two wheels supported by the pair of wheel supporting members.

8 Claims, 5 Drawing Figures

PATENTED JAN 16 1973  3,710,882
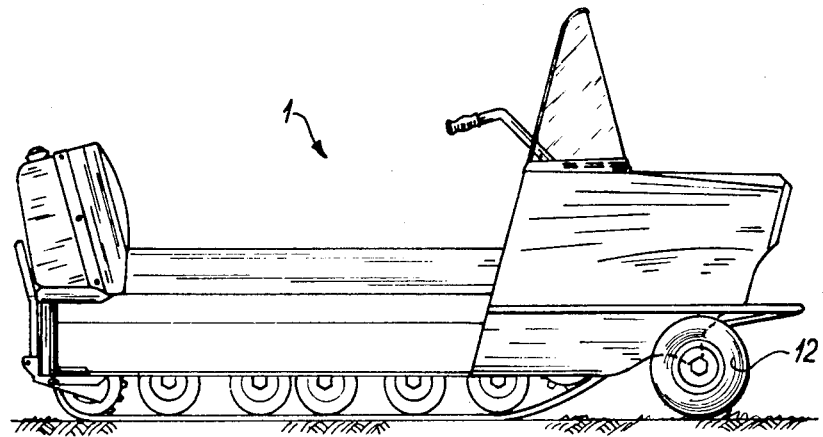
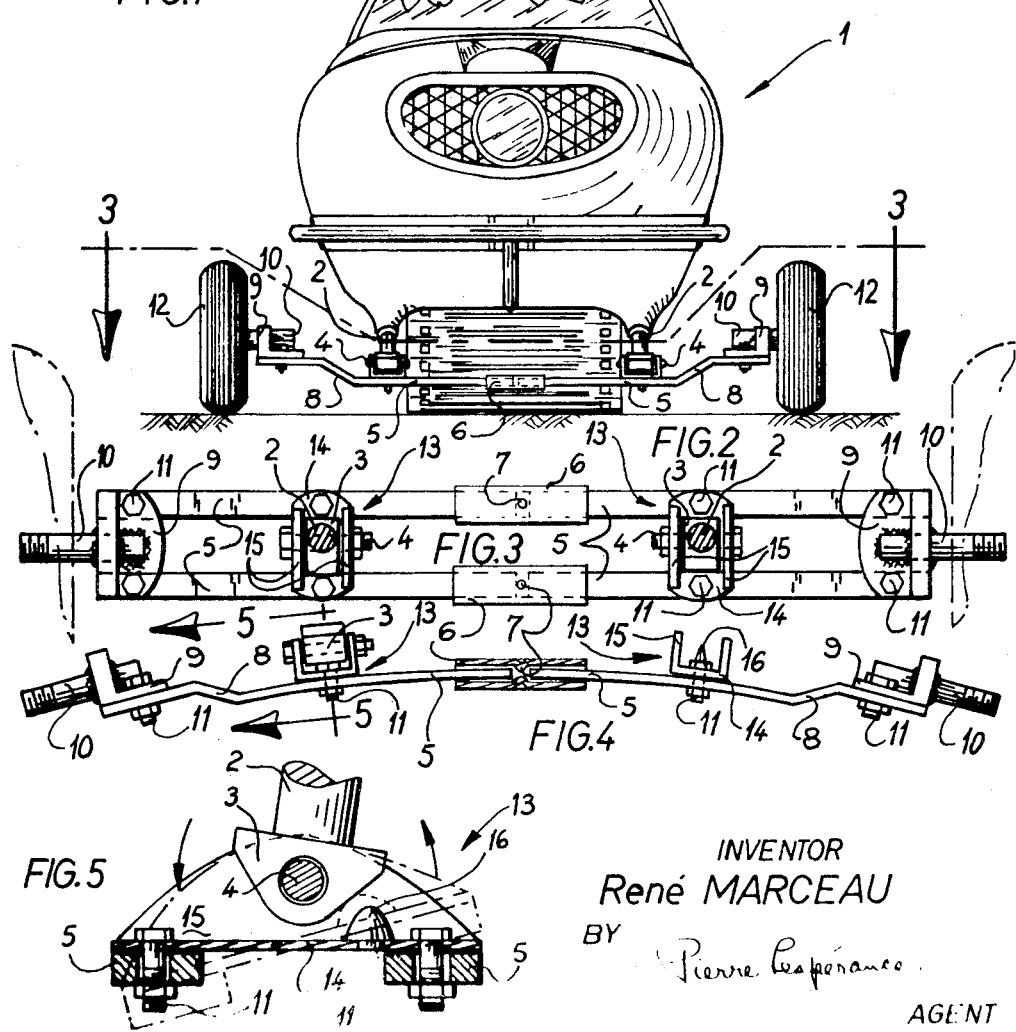
INVENTOR
René MARCEAU
BY Pierre Lesperance
AGENT

FRONT WHEEL STEERING ASSEMBLY

This invention relates to a front wheel steering assembly for a vehicle and, more particularly, adapted to replace the skis of snowmobiles.

It is a general object of the invention to provide a front wheel steering assembly particularly constructed and arranged to replace the skis of snowmobiles.

It is another general object of the invention to provide a front wheel steering assembly which is inexpensive and simple and yet including an effective resilient suspension.

It is another object of the invention to provide a front wheel steering assembly which is adjustable to suit different makes of snowmobiles.

It is a further object of the invention to provide a front wheel steering assembly which is adapted to yield rearwardly upon impact of the front wheels against an obstacle such as to minimize jerking of the associated vehicle.

The above and further features and objects of the invention will be better understood by reading the following disclosure which defines a preferred embodiment of the invention with reference, by way of example only, to the accompanying drawing, in which:

FIG. 1 is a side view of a snowmobile provided with a front wheel steering assembly according to the invention;

FIG. 2 is a front view of the snowmobile of FIG. 1;

FIG. 3 is a cross-sectional view as seen along line 3—3 in FIG. 2;

FIG. 4 is a front view of the front wheel steering assembly shown in unloaded condition; and FIG. 5 is an enlarged cross-sectional view as seen along line 5—5 in FIG. 4.

A snowmobile 1, of a particular design, is shown in FIGS. 1 and 2, but it should be understood that a front wheel steering assembly according to the principle of the invention may be adapted to any make of snowmobiles to replace the skis thereof to thereby use the snowmobiles on other surfaces than ice and snow. The illustrated snowmobile 1 has a pair of spaced apart steering axles 2 projecting below the undersurface thereof and laterally spaced from each other. As is conventional, steering axles 2 can rotate about their longitudinal axes but cannot be moved axially relative to the vehicle body so that they support the latter. As explained later, the invention is also applicable to a vehicle such as a snowmobile or a farm tractor which has only one steering axle 2. Each steering axle 2 is provided with a boss or bracket 3 at the lower end thereof, which boss or bracket 3 is normally used to connect the steering axle to a ski by means of a transverse bolt or pin 4.

A front wheel steering assembly according to the invention will now be defined in detail with particular reference to FIGS. 3, 4, 5. The front wheel steering assembly includes a pair of parallel and spaced-apart resilient links which extend transversely of the snowmobile 1. Each resilient link is formed of two resilient blades 5 aligned end to end. A sleeve 6 interconnects the proximate ends of the two resilient blades 5 of each resilient link. The proximate end of the resilient blades 5 are slidably inserted into the sleeve 6 for adjustable displacement thereof into the latter. Each sleeve 6 is provided with a nib 7 extending inside and intermediate the ends thereof to prevent the same from sliding, such as to disengage the proximate end of one resilient blade 5. Each resilient blade 5 has an upwardly and outwardly bent portion 8 to provide a crank arm action, as will be explained later.

A bracket or member 9 is provided at each end of the pair of parallel resilient links and is pivotally connected at one point of each of two laterally adjacent blades 5 to form an articulated parallelogram frame with the above-defined resilient links. A wheel axle 10 is welded, or otherwise fixed, to each bracket 9 and extends outwardly therefrom. The axles 10 are arranged to be always aligned in the same angular direction, as seen from above when the steering assembly is attached to a vehicle. Bolts 11, or the like, are provided to pivot the brackets or members 9 relative to the resilient blades 5. A road wheel 12 of appropriate diameter, for instance 12 inches, is mounted and retained in any conventional or known manner onto the spindle portion of each wheel axle 10 to provide a rotative support for the front end of the snowmobile 1.

In the embodiment illustrated, a pair of steering axle connecting devices 13 are provided to attach the steering assembly to the two steering axles 2. Each steering axle connecting device 13 comprises a bracket 14 having a pair of spaced-apart flanges 15 adapted to straddle a boss 3. Registering bores are provided through the spaced flanges 15 to receive the bolts 4 therethrough and to define a transversely extending pivot axis for the brackets 14 and, consequently, for the complete front wheel steering assembly. Each steering axle connecting bracket 14 is pivoted at one point of each of the two laterally spaced resilient blades 5 by other bolts 11 or the like, such as to communicate the rotary motion of the steering axles 2, through the bolts 4 to the transversely extending resilient links to cause reciprocating movement of the latter in parallel but opposite directions transversely of the snowmobile 1. The opposite movement of the two resilient links results in steering of the axles 10 and of the front wheels 12 in the same angular direction about upright axes.

A shock absorbing element 16 is mounted on the rear portion of each bracket 14 and is arranged to engage the boss 3 to limit the rearward pivoting of the steering assembly about the above-mentioned transverse pivot axes defined by the bolts 4.

It must be noted that the upwardly bent portions 8 of the resilient blades 5 define resilient links which have a crank shape in side elevation, as shown in FIG. 2, such that the axles 10 are positioned higher than the bolts 4. Due to the crank shape, when the wheels 12 are urged rearwardly under the impact of an oncoming obstacle, the axles 10 are displaced forwardly of the pivot axis such that the weight of the vehicle acting on the volts 4 and the upward reaction by the wheels 12 on the axles 10, causes a restraining couple to act on the steering assembly to pivot the latter towards an operative position of stable equilibrium. The latter is obtained when the resultant radial forces on the axles 10 and on the bolts 4 are in a common plane.

It is also pointed out that the resilient blades are curved longitudinally, substantially as shown in FIG. 4, when no load is applied thereon, such that when in use, that is under the weight of the vehicle, the axles 10 will extend substantially horizontally, as shown in FIG. 2.

It should be appreciated that the curve given to the resilient links depends on the resilience of the blades 5 such that, when the latter are more rigid, the curve thereof does not need to be as pronounced.

The above-defined steering assembly may be attached to snowmobiles of various types. The sleeves 6 allow to adjust the spacing between the two steering axle connecting devices 13 to match the different spacings between the two steering axles 2 of snowmobiles so provided. It is also contemplated to make each resilient link of a single resilient blade extending from one side to the other of the snowmobile. Such resilient link of a single piece can be particularly advantageous if a sufficient number of snowmobiles are produced with the same spacing between the two steering axles.

Each resilient blade 5 may be made, as shown in the drawing, of a single strip of resilient material, such as metal. The resilient blade 5 can be made as well of a single rod or bar, or of a composite laminar structure, such as for instance the well known leaf springs.

For a vehicle which has only one steering axle 2, for instance as certain types of farm tractors, only one steering axle connecting device 13 is used centrally intermediate the wheels 12 with each resilient blade made of a single piece. Rods or braces are provided to pivotally connect the outer ends of one resilient blade to the body of the vehicle, or the vehicle body can be fitted with pairs of downwardly extending ears overlapping the sides of the resilient blades near their ends to absorb the torques about the steering axle, which are produced on the steering assembly by irregular terrains or obstacles engaging one or the other of the front wheels 12.

What I claim is:

1. In a vehicle having a chassis and at least one steering axle projecting downwardly therefrom and rotatable, but not axially movable, relative to said chassis, a front wheel steering and suspension assembly comprising a pair of leaf springs extending transversely of the vehicle and parallel to each other, a steering axle connecting bracket pivotally connected to the lower end of said steering axle for rotation about a pivot axis extending longitudinally of said leaf springs, said steering axle connecting bracket is pivotally connected to each of said leaf springs intermediate the ends of the latter, a wheel axle supporting bracket at each end of said pair of leaf springs and pivotally interconnecting the adjacent ends thereof, said wheel axle supporting brackets forming with said leaf springs an articulated parallelogram frame, and a wheel axle fixed to each of said wheel axle supporting brackets, rotation of said steering axle causing reciprocating movement of said leaf springs in opposite parallel directions relative to each other, said leaf springs supporting said chassis through said steering axle and constituting a spring suspension for the vehicle, as well as steering means, each of said leaf springs having a crank shape and including a bent portion between each wheel axle supporting bracket and said steering axle connecting bracket.

2. In a vehicle as claimed in claim 1, wherein said vehicle has another steering axle spaced from said first-named steering axle transversely of the vehicle and also projecting downwardly from the vehicle and rotatable, but non axially movable, relative to said chassis and further including another steering axle connecting bracket pivotally connected to the lower end of said another steering axle for rotation about a pivot axis extending longitudinally of said leaf springs, and pivotally connected to each of said leaf springs intermediate the ends of the latter.

3. In a vehicle as claimed in claim 1, wherein each of said leaf springs is formed of two cooperating leaf spring elements having proximate ends extending intermediate said one and said another steering axle connecting brackets and an interlinking means retractably connects each two adjoining leaf spring elements and is arranged to allow adjustment of the spacing between said one and said another steering axle connecting brackets to suit different spacings between said one and said another steering axles of a vehicle.

4. In a vehicle as claimed in claim 3, wherein each of said interlinking means is a sleeve engaged over the proximate ends of the two leaf spring elements of each leaf spring, said leaf spring elements being slidably arranged for longitudinal movement inside the associated sleeve, and a nib projects inside each sleeve to prevent disengagement of the sleeves from one proximate end.

5. In a snowmobile as claimed in claim 4, further including shock-absorbing elements mounted on said steering axle connecting brackets and arranged to limit the pivoting movement of the latter about said pivot axis relative to said steering axles.

6. In a snowmobile having a chassis and a pair of spaced-apart steering axles projecting downwardly therefrom and rotatable, but non-axially movable, relative to said chassis, a front wheel steering and suspension assembly comprising a pair of leaf springs extending transversely of the snowmobile and parallel to each other, a pair of steering axle connecting brackets each pivotally connected to the lower end of one of said steering axles for rotation about a pivot axis extending longitudinally of said leaf springs, each of said steering axle connecting brackets is pivotally connected to each of said leaf springs intermediate the ends of the latter, a wheel axle supporting bracket at each end of said pair of leaf springs and pivotally interconnecting the adjacent ends thereof, said wheel axle supporting brackets forming with said leaf springs an articulated parallelogram frame, and a wheel axle fixed to each of said wheel axle supporting brackets, each of said leaf springs has a crank shape and includes a bent portion between each wheel axle supporting bracket and said steering axle connecting brackets, and is arranged to support said wheel axles higher than said pivot axis.

7. In a snowmobile as claimed in claim 6, wherein each of said leaf springs comprises a pair of adjoining leaf spring elements aligned end to end and having proximate ends arranged intermediate said pair of steering axle connecting brackets and a sleeve inserted thereon said two proximate ends to allow sliding movement of the latter therein.

8. In a snowmobile as claimed in claim 7, wherein a nib projects inside each sleeve to prevent disengagement of the sleeve with one proximate end.

* * * * *